(12) United States Patent
Klop

(10) Patent No.: US 8,733,484 B1
(45) Date of Patent: May 27, 2014

(54) LINKAGE FOR DUAL GRILLE SHUTTER SYSTEM

(71) Applicant: Ford Global Technologies, LLC, Dearborn, MI (US)

(72) Inventor: Aaron P. Klop, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/713,325

(22) Filed: Dec. 13, 2012

(51) Int. Cl.
*B60K 11/08* (2006.01)

(52) U.S. Cl.
USPC ............................................. 180/68.1

(58) Field of Classification Search
USPC ............... 180/68.1, 68.2, 68.3, 68.4, 68.5; 267/292, 294, 69, 70, 71, 73, 74
See application file for complete search history.

(56) References Cited

U.S. PATENT DOCUMENTS

| | | | |
|---|---|---|---|
| 1,393,917 A * | 10/1921 | Snell .............................. | 165/98 |
| 1,619,621 A | 3/1927 | Lovejoy | |
| 1,817,398 A | 8/1931 | See | |
| 1,908,046 A | 5/1933 | Petersen | |
| 1,983,543 A | 12/1934 | Illsley | |
| 2,805,027 A | 9/1957 | Ferris | |
| 3,210,003 A | 10/1965 | Quinton | |
| 3,226,025 A | 12/1965 | Ferris | |
| 3,265,300 A | 8/1966 | Selway | |
| 3,759,056 A | 9/1973 | Graber | |
| 5,441,451 A | 8/1995 | Jeung | |
| 8,025,045 B2 * | 9/2011 | Pettersson et al. ........ | 123/568.12 |
| 8,118,087 B2 * | 2/2012 | Saida et al. ................... | 165/202 |
| 8,311,708 B2 | 11/2012 | Kerns | |
| 2011/0097984 A1 | 4/2011 | Hasegawa et al. | |
| 2012/0022742 A1 | 1/2012 | Nemoto | |
| 2012/0074729 A1 | 3/2012 | Fenchak et al. | |
| 2012/0132474 A1 | 5/2012 | Charnesky et al. | |

* cited by examiner

*Primary Examiner* — John Walters
(74) *Attorney, Agent, or Firm* — Jason Rogers; MacMillan, Sobanski & Todd, LLC

(57) ABSTRACT

A shutter system is provided for a grille of an automotive vehicle. A first vane set is disposed at a first grille opening section configured to pivot to a master position. A second vane set is disposed at a second grille opening section configured to pivot to a slave position. An actuator motor is coupled to the first vane set for controllably placing the first vane set to a selected master position. A linkage is coupled between the first and second vane sets for moving the second vane set to the slave position corresponding to the master position of the first vane set. The linkage includes a compensation spring configured to undergo compression when the first and second vane sets are placed in the closed positions and a limit strap for imposing a limit on expansion of the compensation spring.

10 Claims, 5 Drawing Sheets

LINKAGE FOR DUAL GRILLE SHUTTER SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automatically positioned grille shutter systems for automotive vehicles for providing a cooling air flow into an engine compartment, and, more specifically, to joining multiple vane sets of an active grille shutter system in a manner that ensures complete closure of a slave vane set controlled via a linkage by a master vane set.

A vehicle grille located at a front of a vehicle provides an opening for the intake of fresh air into an engine compartment to assist the vehicle's cooling system in cooling the engine, transmission, and other components. The air flow passing through the grille may add aerodynamic drag when the vehicle is in motion. At higher speeds, the rate of the air flow and the resulting drag both increase. With a fixed grille opening that must provide sufficient air flow at all speeds, excess air flow and drag must be tolerated at higher speeds. Accordingly, active grille shutters have been developed to reduce or block air flow to match that needed for cooling purposes, thus reducing aerodynamic drag and improving fuel economy. Closed grille shutters can also provide a faster powertrain warm-up to improve fuel economy and performance of the passenger compartment heater.

A typical active grille shutter (AGS) includes an actuator that positions the grille shutters based on commands from a powertrain control module. The shutter may pivot through a range of about 90 degrees between fully closed and open positions, which may be typically commanded in fixed increments for a plurality of set shutter positions (e.g., 16 preset positions separated by about 6 degrees).

The actuator may be comprised of a smart motor that communicates with the powertrain control module over a multiplex bus, for example. The motor has an output shaft connected to a fixed grille shutter housing and to one of a plurality of movable vanes which are themselves linked together to form a vane set. When the actuator motor output shaft moves, it moves the attached vane which causes the other linked vanes to move together.

According to the grille styling used on certain vehicles, more than one grille opening may be employed—with each opening containing a respective vane set. The vane sets may usually be in approximate vertical alignment, but are not necessarily coplanar. In order to avoid the cost of placing separate actuators at each vane set, a linkage may be provided between the vane sets in a master/slave relationship. However, due to manufacturing tolerances it has been difficult to ensure that both of the linked vane sets become completely closed in synchronization. The actuator senses a resistance to movement when one vane set becomes fully closed. In response to the resistance, the motor shuts off. If one vane set remains partially open, the aerodynamic performance is reduced and undesirable noise may be created. Thus, it would be desirable to ensure full closure of each vane set despite any variations in the manufactured shapes or tolerances of the grille housing, vane sets, or linkage.

In using a single motor for controlling multiple vane sets, the motor torque requirements are increased, thereby necessitating a larger, more expensive motor. The highest motor torque required to be delivered by the motor typically corresponds to the act of opening the vane sets from a fully closed position during a time when the vehicle is traveling at high speed because of the need to overcome wind resistance. Additionally, a high motor torque may be required to open closed vanes that may be frozen in place by snow and ice in a cold climate. Thus, it would also be desirable to reduce the required motor torque when opening the closed vane sets.

SUMMARY OF THE INVENTION

In one aspect of the invention, a shutter system is provided for a grille of an automotive vehicle. A first vane set is disposed at a first grille opening section configured to pivot to a master position selected from a closed position and a plurality of open positions. A second vane set is disposed at a second grille opening section configured to pivot to a slave position corresponding to the master position, including a closed position and a plurality of open positions. An actuator motor is coupled to the first vane set for controllably placing the first vane set to a selected master position. A linkage is coupled between the first and second vane sets for moving the second vane set to the slave position corresponding to the master position of the first vane set selected by the actuator motor. The linkage includes a compensation spring configured to undergo compression when the first and second vane sets are placed in the closed positions and a limit strap for imposing a limit on expansion of the compensation spring.

DETAILED DESCRIPTION OF PREFERRED EMBODIMENTS

Figure 1:
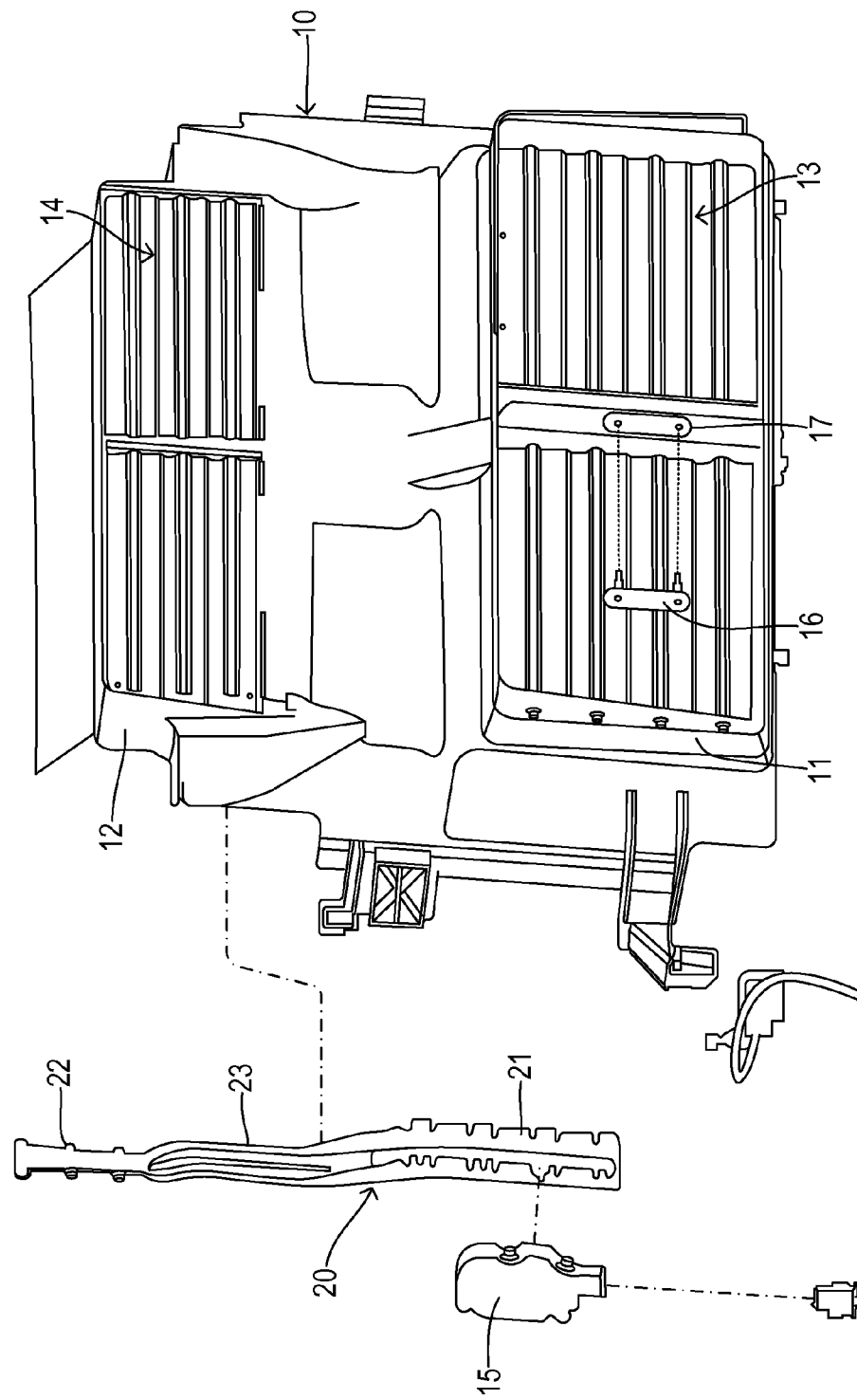
FIG. 1 is an exploded view showing a known type of dual shutter system with an actuator motor.

Referring to FIG. 1, an active grille system includes a grille housing 10 with a first grille opening section 11 and a second grille opening section 12. A master vane set 13 is disposed in grille opening section 11 and is configured to pivot all of its individual vanes to a master position selected between a closed position through a plurality of open positions by a powertrain control module (not shown). Likewise, a slave vane set 14 is disposed in second grille opening section 12 and is configured to pivot to a slave position corresponding to the master position, including the same closed position and plurality of open positions. An actuator motor 15 is mounted to housing 10 using an actuator clip 16 received by motor 15 and retained in a fixed receptacle 17 on housing 10. Actuator motor 15 receives operating power and commands via a wiring harness 18.

A linkage 20 is connected to a moving output (e.g., shaft) of actuator motor 15 and to one or more individual vanes of vane sets 13 and 14. A first end 21 is joined to vane set 13 and a second end 22 is joined to vane set 14. An intermediate section 23 is configured according to an intended design specification that defines the spatial relationship between vane sets 13 and 14. However, the stacked tolerances of the individual components or other build variations or changes over time during service use may result in an ability to fully close both vane sets 13 and 14 once they are linked together.

Figure 2:
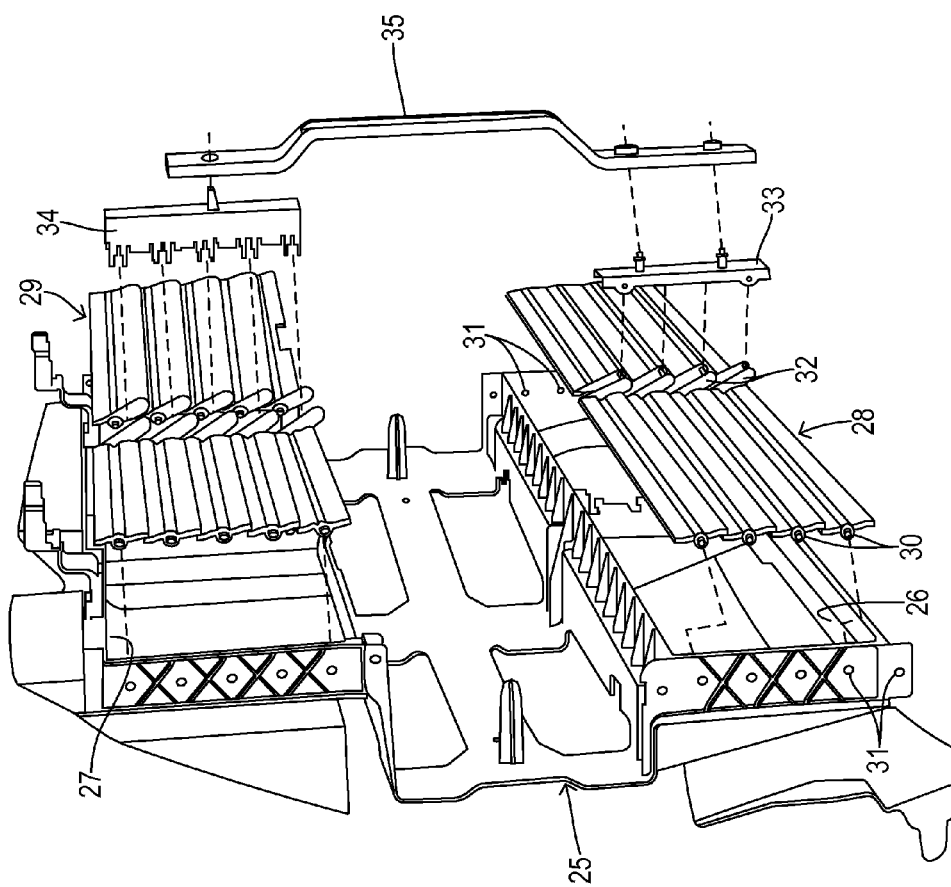
FIG. 2 is an exploded view of another dual shutter system showing a fixed linkage in greater detail.

FIG. 2 is another prior art active grille system having a housing 25 with a first grille opening section 26 and a second grille opening section 27. A first vane set 28 selectably controls an air flow through first opening section 26. Individual pivot ends 30 on the ends of individual vanes are received in holes 31 along the sides of grille opening section 26 to allow the pivoting of each vane between its closed and open positions. Each individual vane also includes a respective pivot arm 32, all of which are joined together by a vane bar 33 so that all the individual vanes in first vane set 28 pivot in tandem. Similarly, a vane bar 34 connects to pivot arms of individual vanes in a second vane set 29 disposed in second grille opening section 27. Vane bars 33 and 34 are joined together by a fixed linkage 35. An actuator motor (not shown) is coupled to one of the vane sets 28 or 29, such as by a direct coupling of a motor output shaft to either one of vane bars 33 or 34 or to an individual vane in one of vane sets 28 or 29. The vane set to which the actuator motor is directly connected is a master vane set and the other vane set is a slave that follows a selected master position of the master vane set by virtue of linkage 35. In one particular embodiment of the present invention, linkage 35 can be modified to incorporate a compensation spring as described below.

Figure 3:
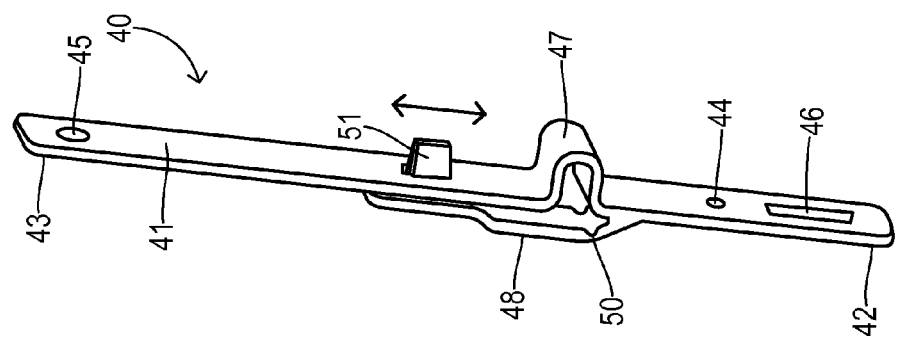
FIG. 3 is a perspective view of a preferred embodiment of a spring linkage of the invention with a limit strap in the assembled position.

As shown in FIG. 3, a linkage 40 of the present invention is comprised of an elongated member 41 preferably made of molded plastic with a first end 42 for coupling to a first vane set (e.g., via a vane bar) and a second end 43 for coupling to a second vane set. The ends may include attachment holes 44 and 45 for connecting to the respective vane sets. First end 42 also includes an attachment hole 46 for interconnecting with a moving output of an actuator motor using any conventional connection or fasteners as known in the art.

Figure 4:
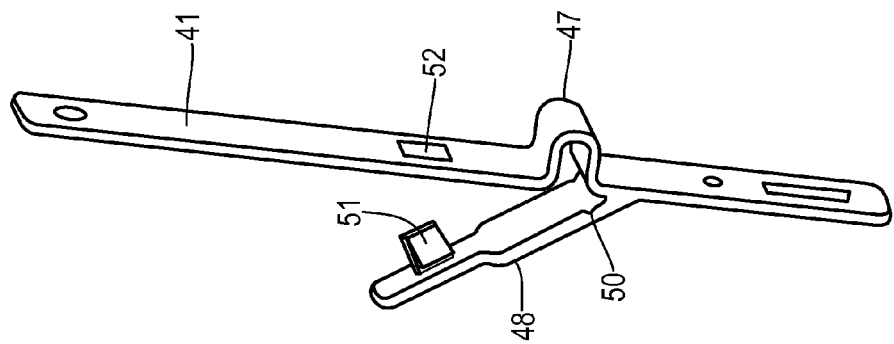
FIG. 4 is a perspective view of the spring linkage of FIG. 3 with the limit strap in the unassembled position.
Figure 5:
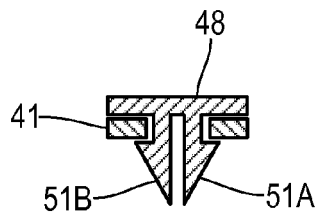
FIG. 5 is a transverse cross section through the sliding snap fit of FIG. 3.

At an intermediate location along elongated member 41, a compensation spring 47 is formed that compresses when ends 42 and 43 are pressed toward one another. In the embodiment shown, compression spring 47 is preferably formed as a U-spring which is spanned by a limit strap 48. Limit strap 48 has one end connected to elongated member 45 on one side of compensation spring 47 by a living hinge 50 and has a second end with a pair of compression prongs 51 projecting from limit strap 48 to be snapped into a slot 52 on elongated member 41 at the other side of compensation spring 47. Linkage 40 with compensation spring 47 and limit strap 48 is preferably manufactured as an integral molding of any convenient thermoplastic material such as PVC. FIG. 4 shows an integrally-formed part as would be ejected from an injection mold, and FIG. 3 shows the linkage after assembly which involves passing compression prongs 51 through slot 52 to form a sliding snap fit. As shown in FIG. 5, prongs 51A and 51B are shaped to be compressed together in order to allow them to pass through slot 52 and then expand in order to be retained within slot 52. By coming into abutment with either end of slot 52, prongs 51 limit the deflection of compensation spring 47 in both directions. However, compensation spring 47 is allowed to compress by a predetermined amount due to slot 52 having a greater longitudinal length than prongs 51.

Figure 6:
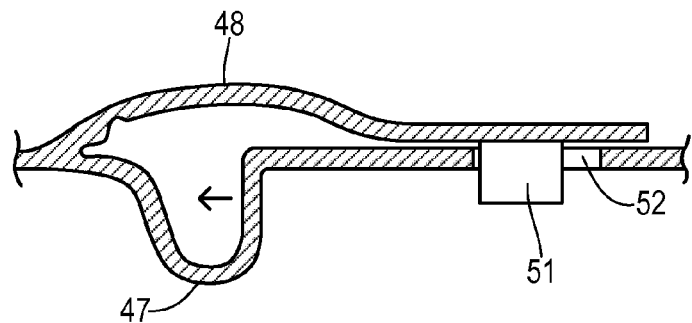
FIGS. 6 and 7 are longitudinal cross sections of a portion of the spring linkage of FIG. 3 in a rest position and a compressed position, respectively.
Figure 7:
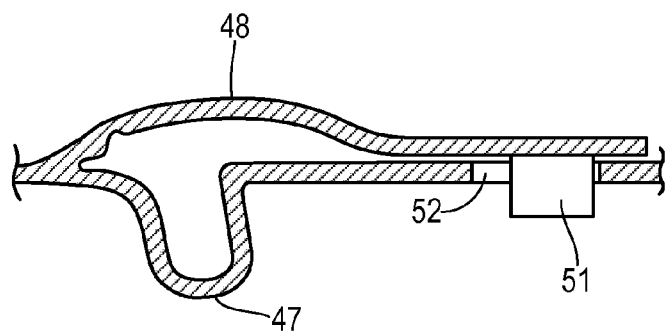

FIG. 6 shows compensation spring 47 in a rest position in which prongs 51 are at a near end of slot 52. The expansion of compensation spring 47 is limited (or even prevented) so that the linkage reliably functions to pull a slave vane set into a more open position in response to the corresponding action of the actuator motor.

To ensure full closing of both vane sets of the present invention, the vane sets and linkage are configured such that the slave vane set closes slightly before the master vane set. Once the slave vane set becomes closed, the actuator motor continues to move the master vane set while simultaneously compressing compensation spring 47. The resistance associated with the compression of spring 47 is less than what would result in the turning off of the motor. The actuator motor turns off only when it senses the resistance from the master vane set reaching its fully closed position. Thus, any build variations or stacked tolerances in the components are compensated for by the compensation spring. Thus, full closing of both vane sets can be assured.

Compression spring 47 remains in compression while both vane sets are closed. When it becomes desired to open the grille shutter, the torque required to be delivered by the actuator motor is reduced because 1) the stored compression energy in the compensation spring assists in the initial movement of the master vane set, and 2) the movement of both vane sets is not initiated at the same time.

Figure 8:
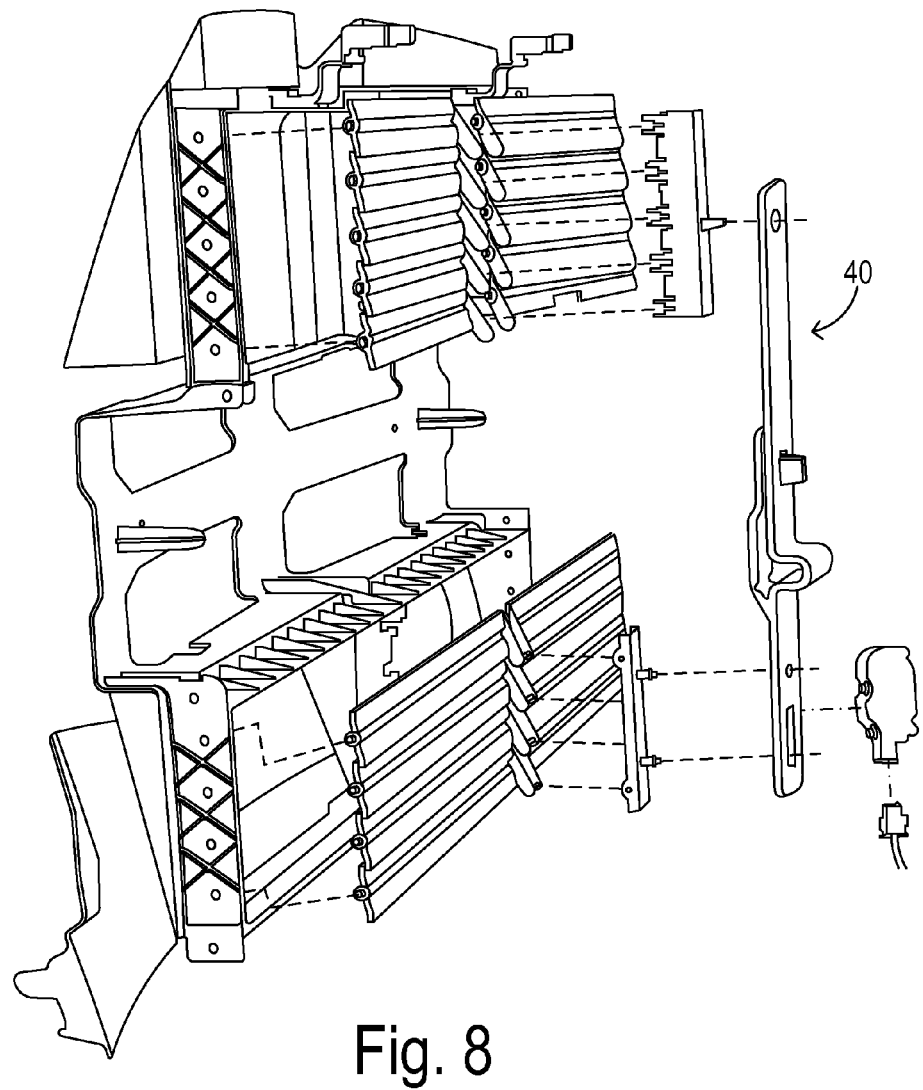
FIG. 8 is an exploded, perspective view of a dual shutter system using the spring linkage of the present invention.

FIG. 8 shows linkage 40 of the invention as shown in FIG. 3 coupled to first and second vane sets in a dual shutter system of the general type as shown in FIG. 2.

The foregoing has shown a spring link design for joining master and slave sets of grille shutter vanes in a manner that overcomes the problems of a vane set not reaching its fully close position while addressing the high torque requirements that were present with prior art rigid link designs. Moreover, the inventive linkage avoids any increase in either the part count or manufacturing cost of an active grille shutter system.

What is claimed is:

1. A shutter system for a grille of an automotive vehicle comprising:
    a first vane set disposed at a first grille opening section configured to pivot to a master position selected from a closed position and a plurality of open positions;
    a second vane set disposed at a second grille opening section configured to pivot to a slave position corresponding to the master position, including a closed position and a plurality of open positions;
    an actuator motor coupled to the first vane set for controllably placing the first vane set to a selected master position; and
    a linkage coupled between the first and second vane sets for moving the second vane set to the slave position corresponding to the master position of the first vane set selected by the actuator motor, wherein the linkage is comprised of a compensation spring configured to undergo compression when the first and second vane sets are placed in the closed positions, and wherein the linkage is comprised of a limit strap for imposing a limit on expansion of the compensation spring.

2. The system of claim 1 wherein the compensation spring has a rest position, and wherein the expansion limit imposed by the limit strap is substantially equal to the rest position.

3. The system of claim 1 wherein the linkage is configured such that when the first and second vane sets are moving into their closed positions, the second vane set enters its closed position prior to the first vane set entering its closed position, and then the compensation spring is compressed as the first vane set reaches its closed position.

4. The system of claim 1 wherein the linkage is comprised of an elongated member made of molded plastic, wherein the compression spring is a U-spring formed at an intermediate location along the elongated member, and wherein the limit strap spans the U-spring.

5. The system of claim 4 wherein the limit strap has a first end attached to the elongated member by a living hinge on one side of the U-spring, and wherein the limit strap has a second end attached to the elongated member by a sliding snap fit on the other side of the U-spring.

6. The system of claim 5 wherein the snap fit is comprised of a pair of compression prongs extending from the limit strap and a slot formed in the elongated member for receiving the compression prongs, and wherein a length of the slot determines the expansion limit of the compensation spring.

7. A linkage for joining vane sets in a grille shutter system, comprising:
   an elongated member with opposed ends for joining with respective vane sets and having a compression spring at an intermediate location on the elongated member; and
   a limit strap spanning the compression spring and having first and second ends attached to the elongated member to limit expansion of the compression spring to substantially a rest position.

8. The linkage of claim 7 the elongated member is comprised of molded plastic, and wherein the compression spring is a U-spring formed at an intermediate location along the elongated member.

9. The linkage of claim 8 wherein the limit strap is integrally molded with the elongated member, wherein the limit strap has the first end attached to the elongated member by a living hinge on one side of the U-spring, and wherein the limit strap has the second end attached to the elongated member by a sliding snap fit on the other side of the U-spring.

10. The linkage of claim 9 wherein the snap fit is comprised of a pair of compression prongs extending from the limit strap and a slot formed in the elongated member for receiving the compression prongs, and wherein a length of the slot determines the expansion limit of the compensation spring.

* * * * *